UNITED STATES PATENT OFFICE.

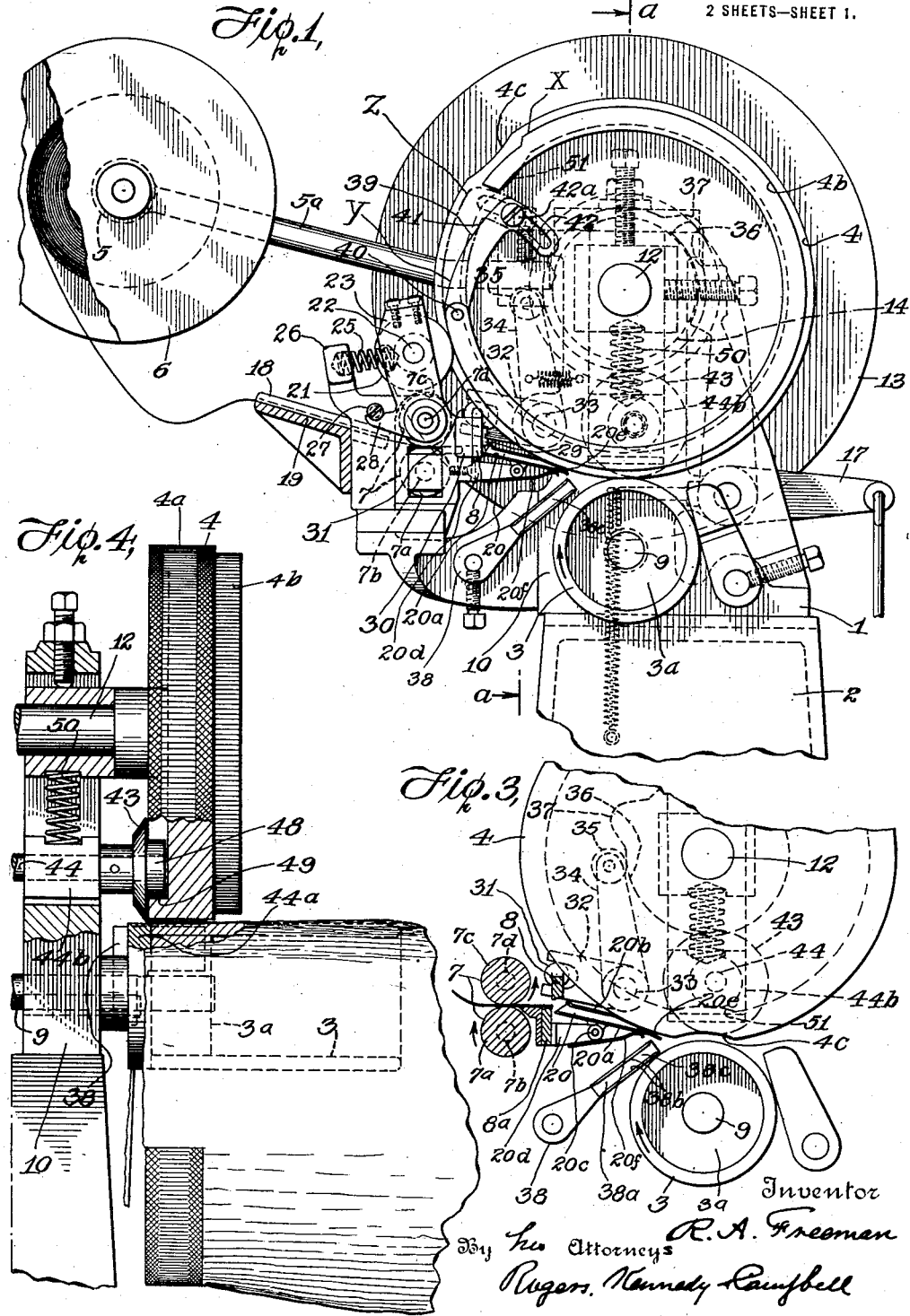

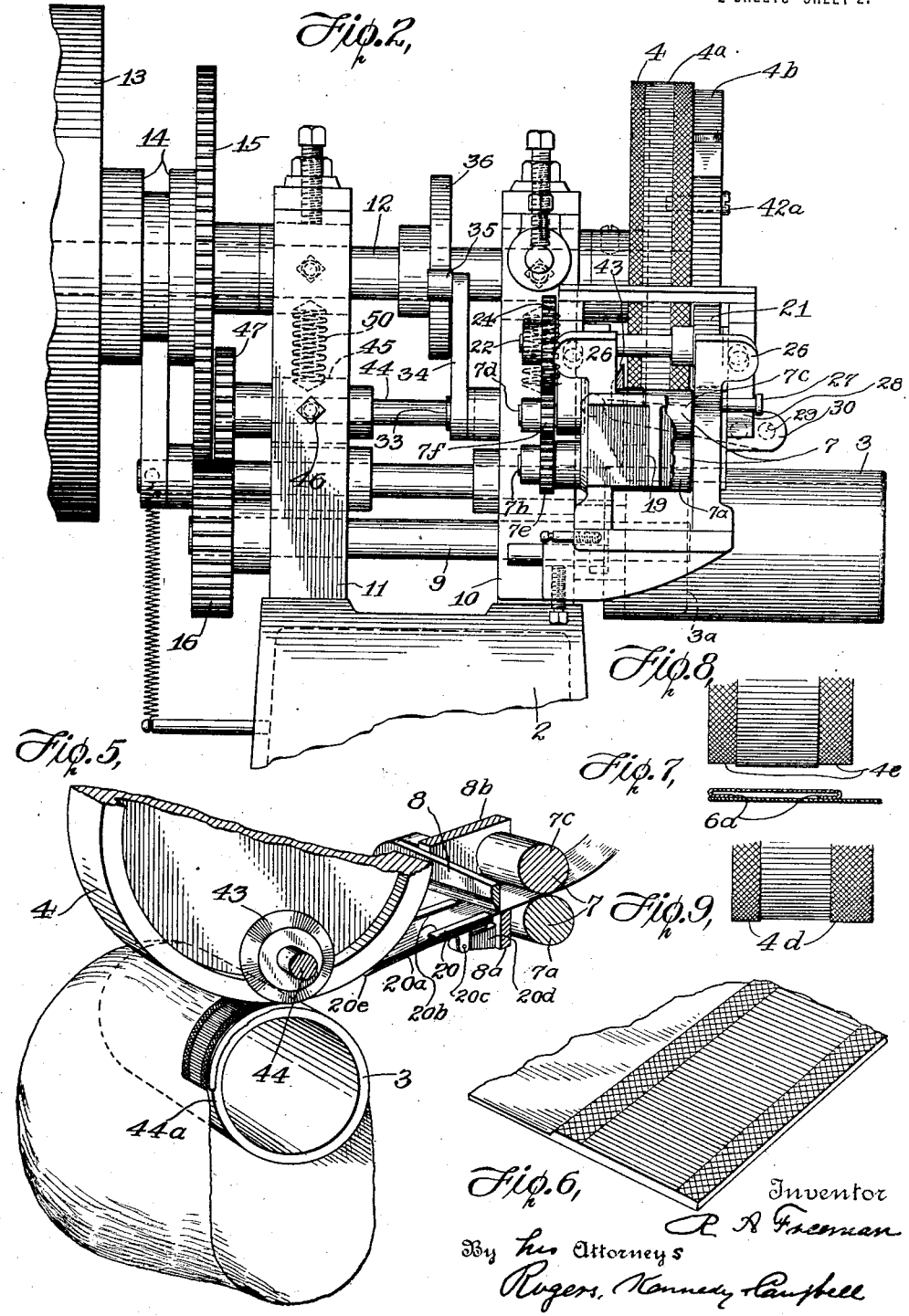

RUFUS A. FREEMAN, OF FLUSHING, NEW YORK, ASSIGNOR TO I. B. KLEINERT RUBBER COMPANY, A CORPORATION OF NEW YORK.

METHOD OF AND APPARATUS FOR MAKING RUBBER ARTICLES.

1,340,883.  Specification of Letters Patent.  Patented May 25, 1920.

Application filed May 17, 1917. Serial No. 169,337.

*To all whom it may concern:*

Be it known that I, RUFUS A. FREEMAN, a citizen of the United States, residing at Flushing, in the county of Queens and State of New York, have invented certain new and useful Improvements in Methods of and Apparatus for Making Rubber Articles, of which the following is a specification, reference being had therein to the accompanying drawing.

This invention relates to the manufacture of articles from sheet rubber, and it consists of an improved method and an improved apparatus for carrying said method into effect, in which two pieces of unvulcanized sheet rubber material are caused to effect surface adhesion with each other and to become integrally united throughout their area of contact by pressure applied to the same to force them into close contact.

The invention is designed for use more particularly in the manufacture of such articles as rubber bathing caps, in applying a rubber binding strip to the edge of the open end of the cap in order to reinforce the same and give it a finished appearance.

In accordance with my invention as regards the method of procedure as applied to the manufacture of bathing caps, a binding strip of unvulcanized sheet rubber is laid on the edge of the cap of the same material, and the two subjected to firm pressure against each other with the result that the surface adhesion of the material will be effected and the strip will be caused to become integrally united with the cap throughout the area of contact and without the employment of cement, the material of the strip and cap being caused by the pressure to flow into each other somewhat in the nature of the flow of metal in a welded joint.

In accordance with the invention as regards the apparatus for carrying the method into effect, means are provided for supporting the cap in such position that the binding strip may be placed in position thereon, and a pressure means is provided which is operable to press the strip flatly and firmly down on the material of the cap and thereby effect a surface connection or adhesion of the same.

Referring to the drawings:

Figure 1 is a front elevation of one form of apparatus for carrying my method into effect.

Fig. 2 is a side elevation of the same.

Fig. 3 is a fragmentary view in front elevation partly in section, showing the position of the parts when the cap is set in place to be operated on.

Fig. 4 is a vertical longitudinal sectional elevation through the front portion of the machine on the line $a-a$ of Figs. 1 and 3.

Fig. 5 is a fragmentary perspective view of the feed rollers, the severing knife, the trimming cutter and adjacent parts.

Fig. 6 is a fragmentary perspective view of a portion of the cap with the binding strip applied thereto.

Fig. 7 is a sectional view of the same showing the binding strip in different form.

Fig. 8 is a side elevation of a portion of the pressure roller of a construction to apply a binding strip of the form shown in Fig. 7.

Fig. 9 is a similar view of a portion of the pressure roller in modified form.

Referring to the drawings:

The operative parts of the machine are mounted in and sustained by a suitable frame comprising a horizontal bed plate 1 supported on the upper ends of legs or standards 2.

My improved machine comprises as its main features a horizontal rotary supporting mandrel 3 over and around which the open end of the cap is passed; a vertical rotary pressure roller 4 supported above the mandrel and adapted to coöperate therewith in pressing the binding strip firmly down on the edge of the cap; a spool or roll 6 to contain a supply of the binding material; feeding rolls 7 between which the strip passes and is fed to the bite of the pressure roller and supporting mandrel; and a severing knife 8 by which the strip is severed in proper lengths to extend around the edge of the cap.

The supporting mandrel is preferably of hollow cylindrical form with its inner end fitted tightly over a cylindrical head 3ª fixed to the forward end of a horizontal rotary shaft 9 mounted in bearings in a front standard 10 and a rear standard 11 extending upwardly from the bed plate of the machine. The shaft is rotated in the direction of the arrows in Figs. 1 and 3 by means of a horizontal driving shaft 12 mounted in bearings in the upper ends of the standards and connected with a constantly operating driving pulley 13, by means of a clutch 14, the driving shaft having fixed thereto a driving gear 15 meshing with a pinion 16 on the rear end of the shaft 9. The clutch is so formed that after being actuated by a foot lever 17 (Fig. 1) to connect the driving pulley with the driving shaft, the clutch will be automatically disconnected after the parts have made one revolution and they will then come to rest.

The pressure roller 4 is fixed to the forward end of the driving shaft to be rotated thereby in the direction of the arrow in Figs. 1 and 3 and the peripheral surface of the roller is formed with a rear cylindrical pressure surface $4^a$ which is corrugated or knurled, and with a front comparatively narrow cylindrical surface $4^b$ of slightly reduced diameter, which is also corrugated or knurled. The pressure roller is so sustained relatively to the supporting mandrel that the pressure surface $4^a$ will overlie the rear end of the supporting mandrel and will coöperate therewith in forcing the binding strip with a rolling pressure against the edge of the cap supported on the mandrel, and will thereby effect the attachment of the strip to the cap. The narrow surface $4^b$, due to its reduced diameter, travels free of the material of the cap and operates to drive the feeding rolls 7 in the manner to be more fully described hereinafter.

The pressure surface $4^a$ of the pressure roller is provided at one point in its circumference with a concavity $4^c$ of a curvature corresponding to the curvature of the supporting mandrel, so that when the roller is in a position where the concavity faces the mandrel as shown in Fig. 3, a curved space will be left between the roller and mandrel in order to permit the cap to be entered between the roller and mandrel with its edge, to which the binding strip is to be applied, beneath the pressure surface of the roller.

The spool 5 on which the roll of binding strip is wound is rotatably supported on the outer end of an arm $5^a$ fixed at its inner end to the machine frame, and from this spool the binding strip passes between guiding plates 18 projecting upwardly from the sides of a downwardly and inwardly inclined supporting surface 19 fixed to the machine frame, whence the strip passes between the feeding rolls 7 by which the material is drawn into the machine and fed to the action of the pressure roller and mandrel. The strip in its passage to the pressure roller passes beneath the severing knife 8 and through a pivoted guide 20 to be more fully described hereinafter.

The feeding rolls 7 comprise a lower horizontal rotary roll $7^a$ fixed on a horizontal shaft $7^b$ mounted in suitable bearings on the machine frame, and an upper horizontal roll $7^c$ fixed on a horizontal shaft $7^d$ also mounted in bearings on the frame, the lower roll being provided with a smooth external surface and the upper roll being roughened or corrugated, and the two rolls being so sustained that when rotated in the direction of the arrows in Fig. 3 they will act on the strip between them and feed the same forward. These feeding rolls are geared together by means of intermeshing pinions $7^e$ and $7^f$ on the respective shafts $7^b$ and $7^c$ and are driven by means of a vertical driving roll 21 fixed to a horizontal shaft 22, mounted at its ends in the upper end of an upright frame 23 mounted to rock at its lower end on the shaft of the upper feeding roller, whereby the frame and consequently the driving roll 21 carried thereby may swing to and from the pressure roller. The frame 23 is so located that the driving roll 21, whose surface is corrugated or knurled, will be engaged by the surface $4^b$ of the pressure roller, and will be rotated thereby and impart a corresponding rotation to the shaft 22. A pinion 24 is fixed to the end of shaft 22 and meshes with the pinion $7^f$ on the shaft of the upper feed roll, whereby this latter roll will be rotated and through the medium of the pinion $7^e$ will impart corresponding rotation to the lower feeding roll.

The swinging frame carrying the driving roll 21 is urged yieldingly toward the pressure roller, so that the driving roll will maintain driving contact with the surface $4^b$, by means of horizontal spiral springs 25 seated between the rear side of the swinging frame and two vertical arms 26 fixed to the machine frame, the forward motion of the swinging frame being limited by means of a stop pin 27 on one of the arms 26 which is engaged by a finger 28 projecting rearwardly from the swinging frame adjacent its axis.

The severing knife 8 comprises a horizontal fixed plate $8^a$ arranged adjacent the feeding rolls at their delivery side, and a vertically movable blade $8^b$, the binding strip after emerging from between the feeding rolls, passing between the two blades so that when the movable blade is swung down it will sever the strip. The movable blade is pivoted at its forward end on a horizontal axis as at 29 to a bracket 30 on the machine frame, and at its rear end it has fixed thereto a head or knob 31 which extends loosely in an open slot in the outer end of a horizontal arm 32 whose inner end is fixed to the forward end of a horizontal rock shaft 33 mounted in bearings on the machine frame. At one end this rock shaft has fixed to it the lower end of a vertical arm 34 whose upper end has journaled thereon a friction roller 35 in position to be engaged by a cam disk 36 fixed to the driving shaft 12. The cam surface is provided with a high point 37 which in the rotation of the driving shaft will engage the roller 35 and, swinging the arm 34 outwardly at its upper end, the slotted arm 32 will be swung down and the knife blade lowered to sever the strip.

The pivoted guide 20 is arranged between the severing knife and bite of the pressure roll and supporting mandrel, and comprises as shown in Figs. 1 and 5, a flat plate 20ª, the side edges of which are bent upwardly and inwardly to form guiding lips 20ᵇ between which the binding strip passes. The guide is pivoted at its under side on a horizontal axis as at 20ᶜ to a horizontal bracket arm 20ᵈ fixed to the frame of the machine and the inner end of the plate 20ª is extended to form a lip 20ᵉ. A leaf spring 20ᶠ fixed to the machine frame at one end bears at its other end against the under side of the plate 20ª and urges the inner end of the guide upwardly so that the lip 20ᵉ thereon will hold the binding strip against the pressure surface 4ª of the pressure roller. This guide causes the binding strip to enter between the pressure roller and supporting mandrel in proper position parallel with the edge of the cap, and the lip 20ᵉ by pressing the strip up against the pressure surface of the roller will cause the front end of the new section of strip to be advanced to the point where it can be gripped between the pressure roller and supporting mandrel.

Arranged beneath the pivoted guide 20 and adjacent the body of the pressure roller and supporting mandrel, is a gage device 38 adapted to determine the proper position of the cap on the mandrel, and the proper relation of the edge of the cap to the pressure surface 4ᵇ when the cap is set in position over the mandrel. This gage device comprises a back plate 38ª fixed in an inclined position in a vertical plane, and two parallel guide plates 38ᵇ projecting forwardly from the edges of the back plate and forming a space 38ᶜ in which the edge of the cap is inserted as it is passed over the mandrel and beneath the pressure roller. In inserting the cap in place to be operated on, it is pushed back until its edge comes up against the back plate of the gage, in which position it will be in its proper relation to the pressure surface 4ᵇ and to the binding strip guided in the pivoted guide 20.

The operation of the mechanism so far described is as follows: The pressure roller being brought to the position shown in Fig. 3, with the cavity 4ᶜ opposite the supporting mandrel, and with the end of the binding strip held by the finger of the pivoted guide against the pressure roller, the cap is passed over the mandrel, its edge entered in the gage and pushed back until the edge of the cap brings up against the back plate of the gage. In this position the edge of the cap, to which the binding strip is to be applied, will be in line with the pressure surface of the pressure roller and also will be in alinement with the binding strip. The clutch controlling the operation of the driving shaft is now actuated and the driving shaft set in motion, thereby imparting rotary motion to the pressure roller, to the supporting mandrel, and to the feeding rolls in the direction indicated by the several arrows in Fig. 1. By these operations of the parts the end of the binding strip will be drawn into the bite of the pressure roller and supporting mandrel and superposed on the edge of the cap therebetween, and the rotation of the parts continuing, the edge of the cap will be drawn around the mandrel together with the binding strip and the latter will be pressed firmly down progressively and continuously on the cap with a rolling pressure by the pressure surface 4ª, and the strip will be caused to unite with the material of the cap progressively throughout the surface of the former, thereby effecting a surface adhesion of the two integrally, somewhat in the nature of a welded joint. At a certain period in the rotation of the pressure roller, the high point of the cam 36 engages the roller 35 on the knife operating arm 34 and swings the severing blade 8ᵇ down, thereby severing the binding strip, which severed portion of the strip will on the continued rotation of the pressure roller and mandrel, be drawn in between them and pressed down on the edge of the cap, thereby completing the application and connection of the binding strip to the cap throughout the circumference of the same. The parts then come to rest by the automatic disconnection of the clutch after the pressure roller has made a complete revolution, with the cavity 4ᶜ therein opposite the supporting mandrel as shown in Fig. 3. The cap is now released and may be withdrawn forwardly from between the parts.

The parts are of such relative form and construction that after the strip is severed and while the pressure roller is acting to press down the free end of the severed section and unite the same with the material of the cap, the feeding rolls will be inactive, the feed action of the rolls being discontinued at the moment that the severing action takes place, and being resumed again before the pressure roller completes its revolution, the resumption of the feed causing in the latter period of the rotation of the pressure roll, the end of the new section of the binding strip to advance through the guide 20 and enter between the lip of the same and pressure surface 4ª. As a result of this action the end of the new binding strip will be ready, when another cap is inserted in place, to be fed forward in the succeeding operation of the parts.

The point in the revolution of the pressure roller at which the resumption of the action of the feeding rolls takes place, which point is indicated by the letter X (Fig. 1) is a constant point in the circumference of the roller and bears a fixed relation to the cavity 4ᶜ since the end of the new strip must advance the same distance in each succeeding operation from the knife to the end of the guide 20; but the point in the revolution of the pressure roller at which the feed rolls cease the feeding action is made variable according to the circumference of the cap operated on and the consequent length of the binding strip to be applied. This variation is effected in the present instance by forming that portion of the surface 4ᵇ on the pressure roller which is the last to act on the driving roll 21, adjustable, so that it can be set to disengage from the driving roll at an earlier or later period in the revolution of the pressure roller according to the length of the binding strip to be applied. This construction is shown in Fig. 1 where it will be seen that this portion of the surface 4ᵇ is formed on a segmental section or switch 39 pivoted at one end to the front face of the roll on a horizontal longitudinal axis 40 and provided on its free end with an inwardly extending finger 41 containing an arcuate slot 42. An adjusting screw 42ᵃ extends through the slot and is screwed into the face of the roll. By this means the switch section may be set in different positions radially of the pressure roller to cause the driving surface 4ᵇ thereon to disengage from the driving roller 21 at an earlier or later period in the revolution of the pressure roll. When adjusted to an inner position, as shown by the full lines in Fig. 1, the driving surface will disengage from the driving roll at the point Y, and will cease to have a driving effect on the driving roller, this adjustment of the switch being resorted to when a relatively short binding strip is to be applied. When the switch is adjusted farther outwardly as shown in dotted lines in said figure, the disengagement will take place at the point Z for a relatively longer strip, it being understood that the position of the cam point 36 for operating the severing blade must be adjusted accordingly so that the severing action of the strip will take place at the moment of the disengagement of the driving surface from the driving roll. After the surface 4ᵇ is thus disengaged from the driving roll 21, the pressure roller will continue its revolution, with the feeding rolls inactive until point X on the surface 4ᵇ reaches the driving roll 21, whereupon the feed of the strip will be resumed and will continue until the pressure roller comes to rest, the period in the revolution of the pressure roller while the feeding action is inactive causing the free end of the severed strip to be pressed down on the cap, and the final period of said revolution with the feeding action resumed, causing the end of the new strip to advance to the lip on the guide 20 where it will be held against the pressure surface, ready for the next operation. The driving roller 21 when disengaged by the surface 4ᵇ is prevented from moving inwardly beyond its normal position by the stop pin 27 before described.

It is desirable that the extreme edge of the cap and the edge of the binding strip be trimmed off to produce a finished appearance, and this is effected by means of a rotary trimming cutter 43 shown more particularly in Figs. 2 and 4. This trimming cutter consists of a vertical cutting disk mounted on the outer end of a horizontal rotary shaft 44 in such position that the disk will lie close to the rear face of the pressure roller and will coöperate at its cutting edge with a hardened surface 44ᵃ on the rear end of the supporting mandrel. The shaft is mounted in rear of the cutting disk in a vertically movable bearing 44ᵇ guided in the front standard 10 whence the shaft extends rearwardly and is mounted near its rear end in a bearing 45 pivoted in the standard 11 on a horizontal transverse axis 46 so that the forward end of the shaft and consequently the cutting disk thereon may be lifted for the purpose presently to be described. The rear end of the shaft has fixed to it a pinion 47 engaged by the pinion 16 on the mandrel shaft by which a rotary motion is imparted to the trimming cutter. At its forward end the shaft 44 is extended beyond the cutting disk in the form of a stud 48 which is engaged by an annular track 49 on the inner side of the pressure roller, the stud being held yieldingly down against said track by a spiral spring 50 bearing at its lower end against the upper side of the movable bearing 44ᵇ and at its upper end against the front bearing of the driving shaft. At a point in the circumference of the annular track corresponding to the location of the cavity 4ᶜ in the pressure surface 4ᵇ, there is provided an inwardly extending cam surface 51 which is adapted when engaged with the stud 48 to lift the forward end of the shaft and thereby raise the cutter This action takes place when the cavity 4ᶜ in the pressure surface is opposite the supporting mandrel, so that when the cap is passed over the supporting mandrel and entered between the same and the roller, the extreme edge of the cap may be inserted beneath the cutter disk. The gage 38 before alluded to is so positioned in the machine that its back plate will arrest the edge of the cap at a point a slight distance in rear of the trimming cutter, and the guide 20 is positioned so that the rear edge of the binding strip will extend in alinement with the edge of the cap. As a result the trimming cutter will take off only the rough edges of the material and will thereby give the bound edge of the cap a finished and even appearance. When the pressure roller begins its revolution after the cap has been inserted in place the cam surface 51 moves from beneath the stud 48, thereby permitting the cutter to be forced down into action by the spring, and as the binding strip is applied to the cap in the manner before described, the trimming cutter will at the same time trim off the rough edges of the material and produce a finished edge.

It is a quality of unvulcanized sheet rubber that if two sheets be placed face to face and subjected to the action of a comparatively dull cutting or severing edge or die, the material will be severed along said edge but in the severing action the material of the sheets will unite integrally along the severed edges. A sharp cutting edge will however sever the material without uniting the same. I propose to take advantage of this peculiarity by forming the cutting edge of the trimming cutter of such character that while it will sever and trim off the rough edges as above described, it will at the same time cause the severed edges of the strip and material of the cap to become integrally united. This will produce a smooth finished edge, and will better avoid liability of the materials separating from each other.

The binding strip may be of the form shown in Fig. 6 consisting of a simple flat strip, or it may have its edges folded in under the body portion as at 6ª, Fig. 7, thereby producing a double thickness of material at the two edges. In applying a strip of this latter form, the pressure surface of the pressure roller will be formed as shown in Fig. 8, where it will be seen that the end portions are reduced in diameter as at 4ᵉ to accommodate the increased thickness at the edges of the strip. The same result may be secured by forming the pressure surface on the supporting mandrel to coöperate with a uniform surface on the surface roller.

In applying a binding strip of the simple flat form shown in Fig. 6 it may be desirable to form the ends of the pressure surface either on the pressure roll or on the mandrel of greater diameter than the intermediate portion as shown at 4ᵈ, Fig. 9, in order to apply more pressure to the edge portions of the strip to insure their firm adhesion to the material of the cap and to avoid liability of these edges coming loose.

In the accompanying drawings and foregoing description I have shown the device embodied in the detailed form which I prefer to adopt, and which in practice has been found to answer to a satisfactory degree the ends and objects to be attained. It will be manifest, however, that the details of the device may be variously changed without departing from the limits of my invention; and further it will be understood that the invention is not limited to any particular form or construction of the parts except in so far as such limitations are specified in the claims.

Having thus described my invention, what I claim is:

1. The method of applying a binding strip of unvulcanized sheet rubber to a cap of like material, which method consists in applying the binding strip flatly against and directly to the material of the cap along the edge of the same, subjecting the two to pressure throughout their area of contact to force them into intimate contact and integral union with each other, and trimming the outer edges of the cap and strip materials, while causing said edges to unite with each other integrally.

2. In a machine for applying binding strips to rubber caps, the combination of a frame, a rotary mandrel mounted on said frame and projecting outwardly therefrom, a pressure roll also mounted in the frame and rotatable about an axis extending parallel with the axis of the mandrel and sustained in position to cause its peripheral surface to coact with the peripheral surface of the mandrel, the relation of said peripheral surfaces being such that the cap may be passed over the outer end of the mandrel and its edge entered between the mandrel and pressure roll and be supported by the mandrel, and means for feeding a binding strip between the peripheral surface of the pressure roll and supported edge of the cap on the mandrel; whereby the cap will be rotated as the mandrel and pressure rolls are rotated, and pressure will be applied progressively to the strip and edge of the cap and will cause the two to become united.

3. In a machine of the type described, the combination of a rotary mandrel adapted to support the article to receive a binding strip, and a rotary pressure roll having a pressure surface adapted to engage the strip and operable to press the same firmly and progressively on the article to cause a surface adhesion of the two, one of said parts being formed with a surface concavity, which, when brought opposite the other part, will leave a space between them in which the edge of the article may be inserted.

4. In a machine of the class described, the combination of a rotary mandrel to support the article to receive a binding strip, a rotary pressure roll provided with a pressure surface to engage the strip and operable to apply pressure progressively to the same and the article, and a rotary trimming cutter in rolling contact with the mandrel and adapted to trim off the edges of the strip and article, said cutter being formed to effect a connection of the trimmed edges.

5. In a machine of the type described, the combination of a rotary mandrel to support the article to receive a binding strip, a pressure roll having a pressure surface and operable to apply a progressive pressure to the strip to cause it to adhere to the article, a cutter coöperating with the mandrel in trimming off the edges of the strip and article, and means for moving the cutter free of the mandrel to permit the work to be set in place on the mandrel beneath the cutter.

6. In a machine of the type described, the combination of a rotary mandrel to support the article to receive a binding strip, a pressure roll having a pressure surface and operable to apply a progressive pressure to the strip to cause it to adhere to the article, one of said parts being formed with a surface concavity adapted when brought opposite the other part to leave a space in which the edge of the article may be inserted, a cutter coöperating with the mandrel in trimming off the edges of the strip and article, and means adapted when the surface concavity of one of said parts is brought opposite the other part, to move the cutter away from the mandrel to permit the work to be inserted in said space beneath the cutter.

7. In a machine of the type described, the combination of a rotary mandrel to support the article to receive a binding strip, a pressure roll having a pressure surface to act on the strip and apply pressure progressively to the same against the article, a gage device in position to be engaged by the edge of the article when the latter is inserted over the mandrel to determine the position of the article on the mandrel, and a guide device engaged by the binding strip to determine the position of the binding strip relatively to the article.

8. In a machine of the type described, the combination of a rotary mandrel to support the article to receive a binding strip, a rotary pressure roll having a pressure surface to act on the strip and apply pressure progressively to the same against the article, feeding mechanism for feeding the strip, said mechanism being driven by the rotation of the pressure roll, means for arresting the driving action of the pressure roll on the feeding mechanism before the pressure roll makes a complete rotation, a severing knife to sever the binding strip, and means for operating said knife at the moment that the driving action of the feeding mechanism is arrested.

9. In a machine of the type described, the combination of a rotary mandrel to support the article to receive a binding strip, a rotary pressure roll having a pressure surface to act on the strip and apply pressure progressively to the same against the article, feeding mechanism for feeding the strip, said mechanism being driven by the rotation of the pressure roll, and means for arresting the driving action of the pressure roll on the feeding mechanism before the pressure roll has made a complete rotation, said means being adjustable to vary the point in the rotation of the roll when its driving action on the feeding mechanism is arrested.

10. In a machine of the type described, the combination of a rotary mandrel to support the article to receive a binding strip, a rotary pressure roll having a pressure surface to act on the strip and apply progressive pressure to the same against the article, feeding mechanism for feeding the strip, said mechanism being driven by the pressure roll, means for arresting the operation of the feeding mechanism before the pressure roll has completed its rotation, and means for renewing the feeding operation and continuing the same until the pressure roll completes its rotation.

11. In a machine of the type described, the combination of a rotary mandrel to support the article to receive a binding strip, a pressure roll formed with a pressure surface to act on the strip and apply progressive pressure thereto against the article, said roller adapted in a complete rotation to apply a given length of strip, means for feeding the strip, and means for arresting the feeding operation before the pressure roll completes its rotation, whereby the end of the strip may be applied to the article, and means for resuming the feeding action and containing the same until the roll completes its rotation, whereby the end of the new length of binding strip will be advanced for the next operation.

12. In a machine of the type described, the combination of a rotary mandrel to support the article to receive a binding strip, a rotary pressure roll having a pressure surface adapted to act progressively on the strip and press the same against the article, said pressure roll being provided also with a driving surface formed with a portion adjustable to and from the axis of rotation, and feeding mechanism for feeding the binding strip to the action of the pressure roll, said feeding mechanism being driven by the said driving surface; whereby by adjusting the movable section inwardly, the driving action of the surface on the feeding mechanism may be arrested before the pressure roll makes a complete revolution.

In testimony whereof, I have affixed my signature.

RUFUS A. FREEMAN.